April 2, 1940.　　F. G. KURTZEBORN　　2,195,819
TRIMMING AND PERFORATING DIE
Filed July 12, 1939　　2 Sheets-Sheet 1
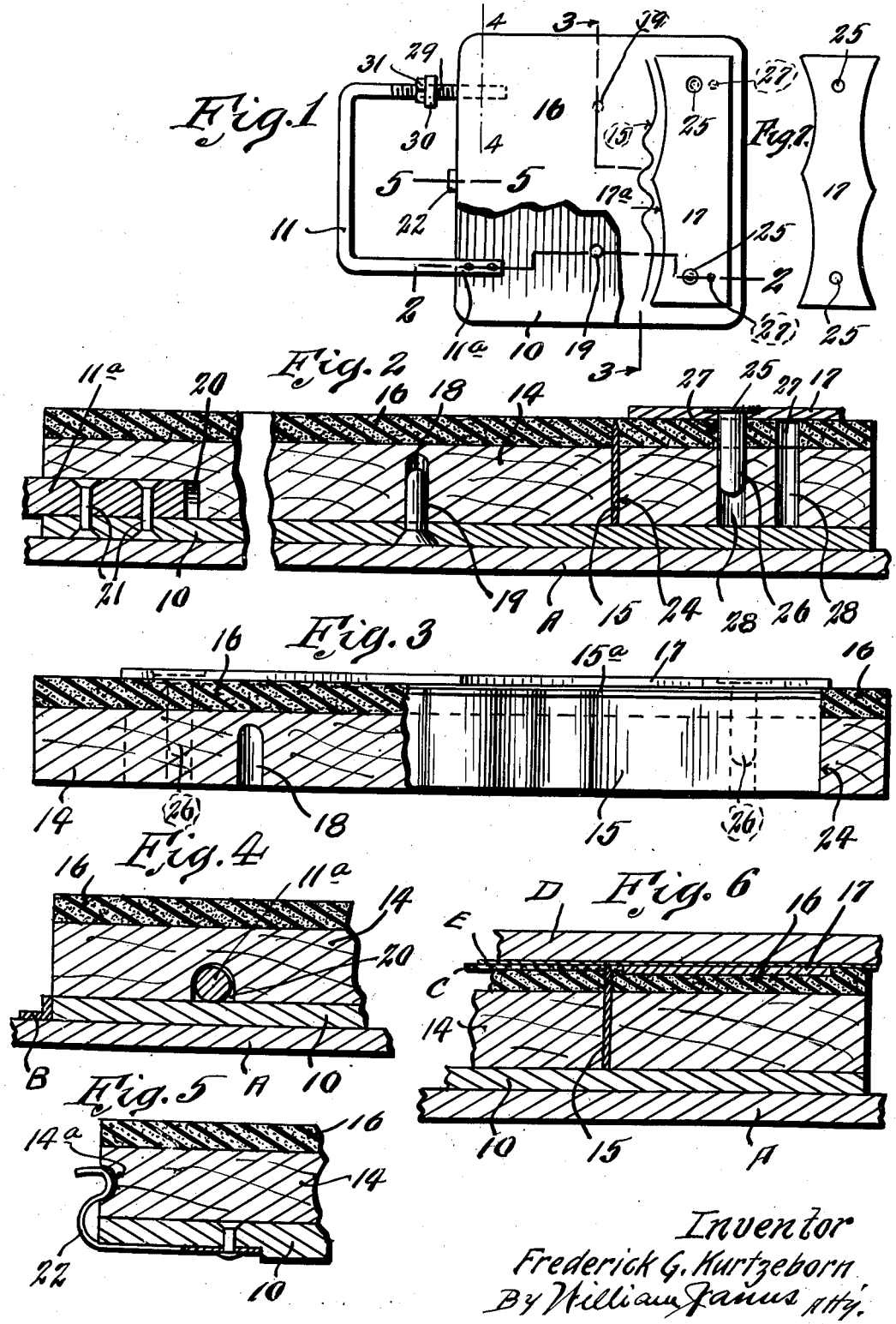
Inventor
Frederick G. Kurtzeborn
By William Janus Atty.

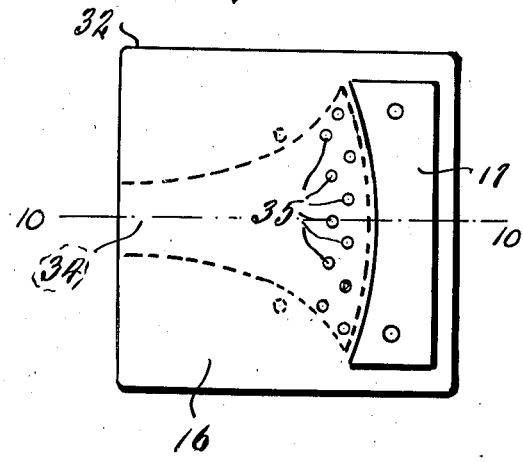
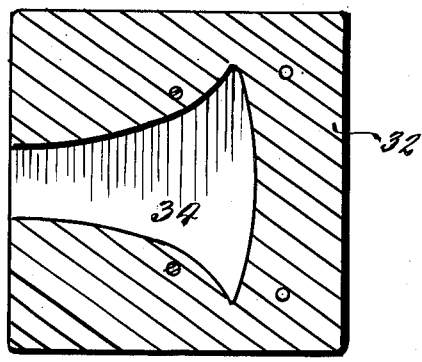
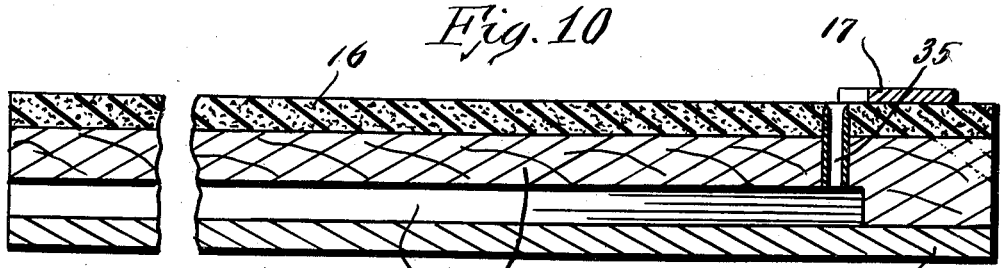
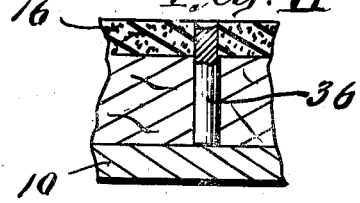
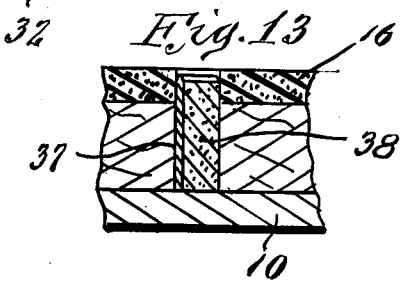
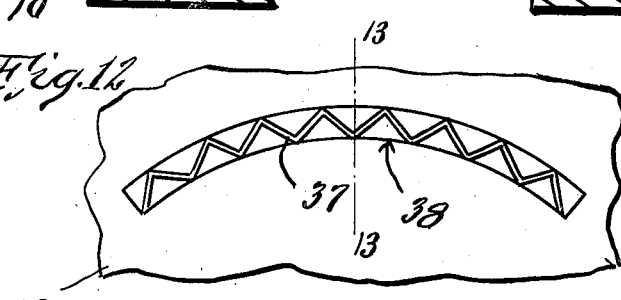

Patented Apr. 2, 1940

2,195,819

UNITED STATES PATENT OFFICE 2,195,819

TRIMMING AND PERFORATING DIE

Frederick G. Kurtzeborn, St. Louis, Mo.

Application July 12, 1939, Serial No. 283,999

10 Claims. (Cl. 164—29)

This invention relates to a trimming and perforating die for leather and other material.

Heretofore, dies used for trimming and perforating shoe uppers or other shoe parts consisted of a base to which was secured the cutting blade or perforating elements. A steel mask or plate was supported on said base by coiled springs with its upper face normally a slight distance above the upwardly presented edge of the blade or other die element. The blade had to be made on a router machine and was consequently expensive to make. The base, mask, and gauge had to be constructed as a single unit and were not separable from each other.

Among the objects of the present invention is the provision of a trimming or perforating die in which the base or sliding plate carrying the base and gauge is formed detachable from these elements and can be used interchangeably with other die units, whereby only a single sliding plate is necessary.

Another object of the invention is to provide a trimming or perforating die unit comprising a base formed of plywood, fiber or other suitable non-metallic material, a trimming or perforating die element fixed in said base and projecting upwardly thereabove, and a rubber stripper fastened to the upper face of said base and forming a support for the work to be operated upon.

Another object of the invention is to provide a die unit including a base and a rubber stripper, and a gauge removably and slidably positioned in said base, whereby said gauge is interchangeable with other gauges or can be made reversible.

Another object of the invention is to provide a trimming die in which the die element is formed of one or more strips of steel having a cutting edge, said strip being bent into the desired shape.

Additional objects of the invention are to provide a trimming and/or perforating die which is inexpensive to manufacture, is light in weight, can be easily handled, has interchangeable parts, and is highly efficient in performing its intended functions.

With these and other objects in view, my invention consists in certain novel features of construction and arrangement of parts, hereinafter more fully described and claimed, and illustrated in the accompanying drawings, in which—

Figure 1 is a top plan view of a die with parts partly broken away.

Figure 2 is an enlarged vertical cross section taken on line 2—2 of Figure 1.

Figure 3 is an enlarged cross section taken on line 3—3 of Figure 1.

Figure 4 is an enlarged cross section taken on line 4—4 of Figure 1.

Figure 5 is an enlarged cross section taken on line 5—5 of Figure 1.

Figure 6 is a detail cross section showing the die in the press with the movable member thereof in downward position.

Figure 7 is a top plan view of a modified form of a gauge.

Figure 8 is a top plan view of a modified form of a die.

Figure 9 is a horizontal cross section through the same.

Figure 10 is an enlarged cross section taken on line 10—10 of Figure 8.

Figure 11 is a detail cross section showing a modified form of a perforating die element.

Figure 12 is a top plan view of a pinking blade.

Figure 13 is an enlarged cross section taken on line 13—13 of Figure 12.

Referring by numerals to the accompanying drawings, 10 indicates a steel sliding plate having the usual handle 11 by means of which said plate can be manipulated and moved into and out of the flat press machine. This plate is similar to the base plate now generally used for this type of work. The die unit 12 is removably positioned on this plate 10. Heretofore this plate was an integral part of the die and a separate plate had to be provided for each die. In my construction, one plate 10 can be used with any number of die units. This not only reduces the cost of the die but also reduces the weight thereof and permits more efficient storing of the device.

The die unit comprises a wooden base 14, a die element 15, a rubber stripper or work support 16, and a gauge or work guide 17.

The base 14 is preferably made of plywood but can be made of fiber, composition or any other suitable material. The underside of this base is formed with upwardly extending bores 18 which are adapted to receive a pair of pins 19 fixed to and projecting upwardly from base plate 10. Pins 19 hold the base 14 in proper position on plate 10 and prevent relative lateral movement of said parts, but at the same time permit removal of said base in an upward direction. Preferably base 14 is of the same area as plate 10 and the forward end of said base is formed in its bottom with two recesses 20 for receiving the ends 11a of handle 11. These ends are disposed on the upper face of plate 10 and are secured thereto in any suitable manner, such as rivets 21. A resilient finger or spring 22 is fixed to the underside of plate 10 and yieldably engages a recess 14a in the forward edge of base 14 and locks the latter against accidental disengagement from plate 10, especially when the assembly is carried by handle 11. The spring member 22 is preferably countersunk in the underside of plate 10 so that the lower face thereof is smooth and lies flat on the bed A of the flat press. The plate 10 is slidably positioned on said bed and guides or rails B fixed to said bed engage the sides of plate 10 and help to locate it properly in the press.

The rubber stripper 16 is secured to the upper face of base 14 and is coextensive therewith. Preferably it is made of rubber sponge of a suitable density and of a predetermined thickness to provide the required resiliency. The upper face of this member 16 is finished rough so that it provides a secure hold for the work or leather piece placed thereon and prevents it from sliding on said support.

The die element 15 is, in the instant case, in the form of a strip bent into proper shape. It is embedded in a saw curve or slot 24 formed in base 14 which slot is of a shape corresponding to the bent form of said blade. This blade extends upwardly past said base 14 and the upper cutting edge 15a terminates just below the upper face of the resilient support or stripper 16.

The gauge 17 is formed of a flat piece of fiber or metal, such as aluminum, and lies on top of the sponge member 16 rearwardly of the die element 15. The forward edge 17a of the gauge is suitably shaped to fit the corresponding edge of the leather piece to be trimmed or perforated. The gauge has fixed thereto flush with its upper face the upper ends 25 of a pair of spaced-apart pins 26 which extend downwardly through apertures 27 formed in rubber piece 16 into bores 28 formed vertically in block or base 14. These pins hold the gauge in proper relation to the die element 15 and also permit the gauge to move in a vertical plane relatively to the base 14, when the die is in the press.

If desired, more than one pair of apertures 27 and bores 28 can be provided so that the gauge 17 can be moved to a number of positions with respect to the die element 15. The gauges are interchangeable so that any gauge can be used with any base 14. Where a right and left gauge is required, one side of the gauge can be formed to be used with shoe trimmings for right shoes and the other side for use with shoe trimmings for left shoes, as shown in Figure 7.

In assembling the die unit together, the blade 15 is formed into the desired shape and a corresponding design is cut in the base 14 in proper relation with the bores 18 and 28. A sheet of sponge rubber of proper thickness and of a size coextensive with said base 14 is cemented to the upper face of the latter. The blade 15 is then forced into the saw cut 24 with the cutting edge 15a presented toward the rubber piece 16. The blade is driven in until the lower or square edge of said blade is flush with the underside of base 14. As the blade is of greater width than the thickness of said base, said blade will cut through the rubber piece 16.

The base 14 is detachably placed in position on the sliding plate 10 and the lower edge of the blade 15 bears against said steel plate 10, so that said blade is at all times in proper position.

The sponge rubber member 16 takes the place of the steel mask or stripper used in the present type of dies and also does away with the coiled springs. The rough finish on the upper face of member 16 serves to hold the work in position so that no clamps are required for the work.

The trimming blade 15 can be formed from a commercially available stock and therefore eliminates the expensive operation of forming the die element on a router machine. The gauge 17 moves up and down with the rubber piece 16 and by virtue of the pins entering the base 14 cannot get out of line. The base 14 and the sponge member 16 can be made of any desired thickness. In the instant case, the base is $\frac{11}{16}$ of an inch thick and the rubber piece is $\frac{1}{4}$ inch thick, while the sliding plate is $\frac{3}{16}$ of an inch thick to conform to the present form and fit in the existing type of presses.

One of the arms of handle 11 is provided with a screw thread, as indicated at 29, and screw-threaded on said portion is a stop 30 and a lock nut 31. The stop 30 is used to engage the forward edge of bed A and limit the inward movement of the die. When the die is in position in the press with the leather piece C in place on member 16, the press is operated to bring the movable member D downwardly against the die. The member D forces the gauge downwardly against the resilient piece 16 and presses the work or leather piece C against the cutting edge of the blade, thereby severing the portion between the blade and the forward edge of the gauge. As is the usual practice, member D is provided with a lining member E of paper or other suitable material to prevent the edge of the blade from coming in contact with the face of member D.

In the modified form shown in Figures 8, 9 and 10, the base 32 is formed on its underside with a recess 34 which opens outwardly at the forward edge of said base. This recess forms a receiver for the waste material cut out by the tubular die element 35.

In Figure 11 the perforating die element 36 is formed with a concave cutting end and the waste material is removed from the top of the die.

In Figure 12 is shown a pinking blade 37 which is formed by bending the strip zigzag so as to provide a plurality of small angular portions. The blade thus formed is then bent or curved into the desired shape and is inserted into a slot 38 cut in base 14. This slot is of a width equivalent to the distance between the crowns of the bends, and the space between the walls of the slot and the angularly disposed portions of the blade is filled with suitable material, such as plaster, to help to hold the pinking blade in proper position.

The base 14 being detachable from the sliding plate 10, the latter can be used interchangeably with various die units or bases 14. This reduces the cost of the die and also provides for better storage of the die units. The sponge rubber or stripper 16 provides proper support for the work. The upper face of said stripper 16 being finished rough it prevents sliding of the work so that no spring clips or clamps are necessary.

The base 14 is preferably made of plywood of the required thickness to prevent warping and splitting. However, the base can be made of other material suitable for the purpose.

The die element or elements are inexpensive and can be easily inserted in base 14.

My improved trimming and ornamenting die is of simple construction, light in weight, and can be economically manufactured.

While I have shown and described herein the preferred embodiments of my invention, it is to be understood that various changes in the construction and arrangement of parts of my die can be made and substituted for those herein disclosed without departing from the spirit of my invention.

I claim:

1. A die of the character described comprising a sliding plate adapted to be placed in a press, a stop on said plate for gauging the movement thereof in said press, a plurality of upward projections fixed to said plate, a removable base having a plurality of seats formed on its underside for receiving said projections and detachably holding said base on said plate, a resilient work support secured to the upper face of said base, and a die element fixed in said base and having its upper end terminating adjacent to the upper face of said resilient work support and having its lower end flush with the underside of said base and bearing against said sliding plate, whereby said plate forms a rigid wear-resisting backing for said die element.

2. A die of the character described comprising a base, a sponge rubber member secured to the upper face thereof, a die element fixed in said base and extending upwardly and having its upper end terminating adjacent to the upper face of said sponge rubber member, and a gauge placed on top of said sponge rubber member in a predetermined relation with said die element and in operative engagement with said base for relative movement in a vertical plane but held against lateral movement.

3. A die of the character described comprising a sliding plate, a plurality of pins fixed to and projecting upwardly from said plate, a comparatively thick base of non-metallic material having on its underside a plurality of apertures for receiving said pins, whereby said base is removably held on said plate, said base having a cut formed therein extending from top to bottom, a rubber piece of suitable resiliency and thickness secured to the upper face of said base, a die element positioned in said cut of said base and having its upper end terminating adjacent to the upper face of said rubber piece, and having its lower end bearing against said plate, whereby the latter forms a rigid backing for said die element, and means for locking said base to said sliding plate to prevent accidental displacement.

4. A die of the character described comprising a base formed of plywood of suitable thickness, a sponge rubber member of suitable thickness secured to the upper face of said base, a die element fixed in said base and extending upwardly therefrom and terminating adjacent to the upper face of said sponge rubber piece, a gauge placed on top of said sponge rubber piece in a predetermined relation with said die element, and means on said gauge having sliding engagement with said base to permit movement of said gauge in a vertical plane only.

5. A trimming die comprising in combination with a sliding plate, of a wooden base resting on said plate and having a slot cut therein interlocking projections and recesses formed on the opposed faces of said plate and base for holding the latter against lateral movement on said plate, a sponge rubber work support member secured to the upper face of said base, a trimming blade inserted in said slot and extending upwardly therefrom and terminating adjacent to the surface of said work support member, and a gauge resting on top of said work support member in fixed relation with said blade.

6. A trimming die comprising in combination with a sliding plate, of a plurality of pins fixed thereon and projecting upwardly a wooden base, a plurality of downwardly presented bores in its underside for engaging said pins, whereby said base is held against lateral movement but is removable upwardly, said base being of suitable thickness and provided with a saw cut corresponding in size and shape to the trimming cut to be made, a resilient work support member secured to the upper face of said base and having a cut formed therein corresponding with the cut of said base, a trimming blade bent into proper shape and forced into said cut and having its upper cutting edge terminating adjacent to the base of said resilient work support member, and a gauge resting on said work support in spaced relation with said blade and movable in a vertical plane only.

7. A trimming die comprising in combination with a sliding plate, of a plurality of pins fixed thereon and projecting upwardly a wooden base, a plurality of downwardly presented bores in its underside for engaging said pins, whereby said base is held against lateral movement but is removable upwardly, said base being of suitable thickness and provided with a saw cut corresponding in size and shape to the trimmed cut to be made, a resilient work support member secured to the upper face of said base and having a cut formed therein corresponding with the cut of said base, a trimming blade bent into proper shape and forced into the cut of said base and having its upper cutting edge terminating adjacent to the base of said resilient work support member, and having its lower edge terminating flush with the underside of said base, and a steel plate engaging the underside of said base and supporting the lower end forming a rigid support for the lower edge of said blade, whereby said steel plate forms a firm, non-yielding backing for said trimming blade.

8. A device of the character described comprising a base, a rubber stripper and work support secured to the upper face of said base, a die element fixed to said base and having its upper end terminating adjacent to the face of said work support, and a gauge resting on top of said work support in fixed relation with said die element and slidably mounted in said base for movement in a vertical plane.

9. A device of the class described comprising a base, a sponge rubber work support secured to the upper face of said base, a die element fixed to said base and having its upper end terminating adjacent to the face of said work support, a gauge resting on top of said work support in fixed relation with said die element, and means fixed to said gauge and slidably mounted in said base for movement in a vertical plane only.

10. A device of the class described comprising a base, a sponge rubber work support secured to the upper face of said base, a die element fixed to said base and having its upper end terminating adjacent to the face of said work support, a gauge resting on top of said work support in fixed relation with said die element, and means for removably and reversibly mounting said gauge in said base.

FREDERICK G. KURTZEBORN.